United States Patent
Kahn

[11] 3,741,629
[45] June 26, 1973

[54] ELECTRONICALLY VARIABLE IRIS OR STOP MECHANISMS

[75] Inventor: Frederic Jay Kahn, Madison, N.J.

[73] Assignee: Bell Telephone Laboratories, Incorporated, Murray Hill, Berkeley Heights, N.J.

[22] Filed: Oct. 26, 1971

[21] Appl. No.: 192,115

[52] U.S. Cl. ............ 350/160 LC, 350/150, 350/205, 350/267
[51] Int. Cl. ............................................. G02f 1/16
[58] Field of Search ............... 350/160 R, 160 LC, 350/267, 150, 205

[56] References Cited
UNITED STATES PATENTS
3,512,876  5/1970  Marks ............................. 350/267
3,675,988  7/1972  Soref ............................. 350/160 LC Primary Examiner—Edward S. Bauer
Attorney—W. L. Keefauver

[57] ABSTRACT

An electro-optic material whose optical transmission characteristic varies with applied voltage is disposed between two planar electrodes. One of the electrodes comprises a high-resistivity transparent section bounded by a low-resistivity annular section. Application of a voltage between the annular section and the other electrode establishes a radially-directed voltage gradient in the plane of the one electrode. In turn, the voltage drop across the electro-optic material is a function of radial distance from the annular section to the center of the bounded section. In this way the optical transmission characteristic of the material is selectively controlled in a radial manner to achieve an electronically variable iris effect or an electronically-variable stop effect.

14 Claims, 7 Drawing Figures

PATENTED JUN 26 1973　3,741,629

ELECTRONICALLY VARIABLE IRIS OR STOP MECHANISMS

BACKGROUND OF THE INVENTION

This invention relates to variable aperture devices and more particularly to improved electronically-variable iris or stop mechanisms utilized for controlling the amount of light transmitted therethrough.

In a variety of applications of practical importance, the amount of light transmitted to a target area is selectively controlled by interposing a variable aperture mechanism in the path of the light. Conventional mechanisms of this type, for example, irises, are of the mechanical or electro-mechanical type.

Nonmechanical electronically-variable irises have also been developed. For example, several such nonmechanical irises are described in a copending application of E. I. Gordon, Ser. No. 79,021, filed Oct. 8, 1970, now abandoned. The irises described in the Gordon application include either nonplanar or segmented electrodes and are based on the establishment of a radial field gradient in a material whose optical density varies with applied electric field.

SUMMARY OF THE INVENTION

An object of the present invention is an improved iris or stop mechanism.

More specifically, an object of this invention is a nonmechanical electronically-variable iris or stop device that is characterized by simplicity, reliability, low cost and ease of construction.

Briefly, these and other objects of the present invention are realized in a specific illustrative embodiment thereof that includes planar electrodes for applying a radially varying electric field to a thin film of an electro-optic material whose optical transmission characteristic varies as a function of applied voltage. One of the electrodes comprises a high-resistivity transparent section bounded by a low-resistivity annular section. Application of a voltage between the annular section and the other electrode of the device establishes a radially directed voltage gradient in the plane of the one electrode. Accordingly, the voltage drop across the electro-optic material is a function of radial distance from the annular section to the center of the bounded section. As a result, the optical transmission characteristic of the material is selectively controlled in a radial manner thereby to serve as the basis for achieving an electronically-variable iris effect or an electronically-variable stop effect.

BRIEF DESCRIPTION OF THE DRAWING

A complete understanding of the present invention and of the above and other objects and advantages thereof may be gained from a consideration of the following detailed description taken in conjunction with the accompanying drawing, in which.

DETAILED DESCRIPTION

Figure 1A:
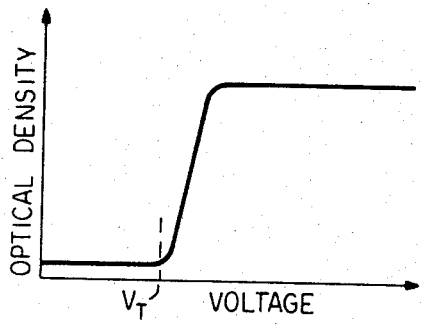
FIGS. 1 A and 1 B respectively depict the optical density-voltage characteristics of electro-optic materials or arrangements of the type suitable for inclusion in irises and stops, respectively, made in accordance with the present invention.
Figure 1B:
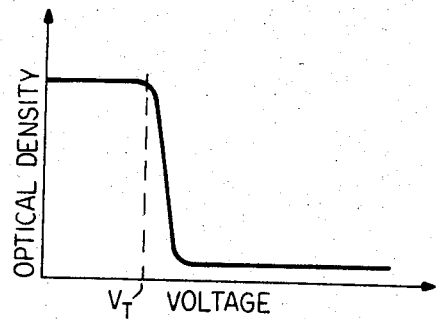

Embodiments of the present invention include a variable optical density arrangement having a characteristic either of the type shown in FIG. 1A or of the type shown in FIG. 1B. The optical density versus voltage plot of FIG. 1A represents an electrically sensitive light-transmitting arrangement whose optical density increases rapidly to an approximately constant value as the voltage applied to one component of the arrangement exceeds a threshold value $V_T$. For voltages in excess of $V_T$, the arrangement represented by FIG. 1A is considered to be relatively opaque. For voltages below $V_T$, the arrangement is essentially transparent. An arrangement having the characteristic of FIG. 1A constitutes an integral component of an iris device made in accordance with the principles of the present invention.

An arrangement having the characteristic shown in FIG. 1B is optically opaque for relatively low applied voltages (below $V_T$) whereas the arrangement appears relatively transparent for applied voltages in excess of $V_T$. Such an arrangement is adapted to be a component of a stop device made in accordance with the principles of this invention.

Various classes of electro-optic materials exhibit directly the characteristics represented in FIGS. 1A and 1B and are suitable for inclusion in iris and stop structures made in accordance with the principles of the present invention. Other classes of materials, when combined with associated components, such as, for example, polarizers, constitute one component of overall arrangements that exhibit the characteristics of FIG. 1A or FIG. 1B. One advantageous such latter class comprises twisted orientation nematic liquid crystals which are described, for example, in "Voltage-Dependent Optical Activity of a Twisted Nematic Liquid Crystal," by M. Schadt and W. Helfrich, *Applied Physics Letters*, 18, pp. 127–128, 1971. A liquid crystal of this type will be referred to hereinafter as a TON material.

A TON material comprises long rod-like molecules. Assume a sample of such a material disposed between parallel, planar, transparent electrode surfaces. Also assume this sample to have positive dielectric anisotropy. Illustratively, a d.c. electrical bias source is connected to the electrode surfaces. In the absence of a voltage applied to the electrodes, the long axes of the molecules within respective planes parallel to the electrode surfaces are arranged parallel to each other. But in proceeding from one electrode to the other, the long axes are progressively shifted in orientation in successive planes to execute a cumulative 90° twist about an axis normal to the electrodes. However, in response to the application to the TON material of a threshold electric field, the molecules thereof begin to reorient so as to align their long axes normal to the electrode surfaces. At fields proportional to voltages in excess of $V_T$, substantially all the molecules are aligned with their long axes normal to the electrodes.

Assume a beam of plane-polarized light propagating perpendicular to one of the electrode surfaces confining the TON material. In the absence of an electric field applied to the material, the beam will have its plane of polarization rotated 90° in the course of propagating through the material. Significantly, this rotation phenomenon, which arises from the aforementioned twisted molecular orientation, is independent of the wavelength of the incident light beam. At relatively high applied fields, on the other hand, the incident light beam propagates along the optical axis of an optically uniaxial crystal and, hence, experiences no polarization rotation in traversing the TON material.

In view of the above, it is evident that by placing a TON sample (with transparent electrodes) between conventional crossed polarizers, an optical density-voltage characteristic of the type shown in FIG. 1A is achieved. Similarly, by combining parallel polarizers with such a sample, the FIG. 1B characteristic results.

Other electro-optic materials are suited for inclusion in embodiments made in accordance with the principles of the present invention. One advantageous other class of materials comprises dispersions of conductive dipoles suspended in transparent fluids. The dipoles can be aligned by electric fields whereby the transmission, reflection and absorption characteristics of the material can be thereby electrically controlled. (Advantageously, a.c. fields are preferred for controlling the dipole suspensions.) These materials are described for example in "Electrooptical Characteristics of Dipole Suspensions," by A. M. Marks, *Applied Optics*, 8, pp. 1397–1412, 1969. Inherently, such suspended dipole materials absorb strongly over a fairly wide range of incident light frequencies. The absorption characteristic of such a material can be controlled to match the requirements of specified applications by preselecting the physical parameters of the suspended dipoles. In some cases it is advantageous to include in the fluid of such a material a variety of different-sized suspended dipoles thereby to achieve a specified absorption characteristic.

Figure 2:
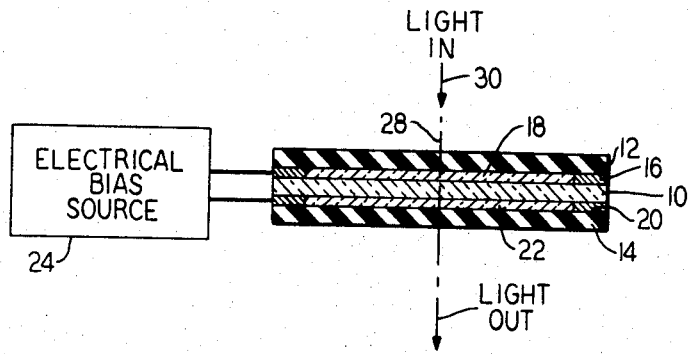
FIG. 2 is a front sectional view of a specific illustrative iris which embodies the principles of this invention.

A front cross-sectional view of a specific illustrative iris or stop structure made in accordance with the principles of the present invention is shown in FIG. 2. The depicted sandwich-like structure includes an electro-optic layer 10 which, for example, is composed of a TON material or a dipole suspension material of the type specified above. If TON is used, the layer 10 has, illustratively, a thickness value in the range 6–50 microns whereas if the layer 10 comprises a dipole suspension material, the thickness thereof is typically 1–30 mils.

The layer 10 of FIG. 2 is contained between two composite electrodes that are respectively deposited on transparent substrates 12 and 14 which constitute, for example, cylindrically shaped glass members. The top electrode deposited on the substrate 12 comprises a low-resistivity ring member 16. Encompassed within and coplanar with the ring member 16 is a high-resistivity transparent material 18 which, illustratively, is homogeneous in nature. A top view of this upper electrode is shown in FIG. 3.

Figure 3:
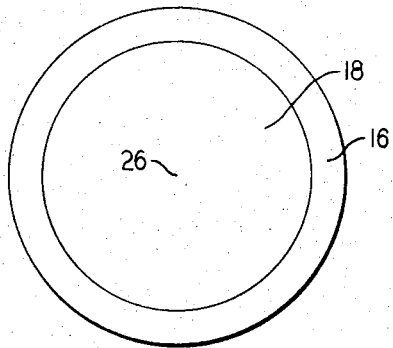
FIG. 3 is a top view of one of the electrodes included in the FIG. 2 embodiment.

Illustratively, the elements 16 and 18 of FIGS. 2 and 3 are made of $SnO_2$ and Al.

In the iris embodiment illustrated in FIG. 2, the lower composite electrode comprises a ring member 20 and a bounded coplanar portion 22 and is, for example, identical to the aforedescribed upper electrode. The ring electrodes 16 and 20 are connected by electrical leads to the terminals of an electrical bias source 24 which is adapted to apply either a d.c. or an a.c. variable voltage between the elements 16 and 20.

If the resistivity of the encompassed material 18 and 22 is high relative to the resistivity of the electro-optic layer 10, there is established in the FIG. 2 arrangement a radially directed voltage gradient in the plane of each electrode. As a result, the voltage drop across the electro-optic material is a function of radial distance from the ring electrode 16 to the center point 26 of the bounded electrode material 18. (The point 26 lies on the main axis 28 of the iris structure).

For applied d.c. voltages the resistivities and thicknesses of the encompassed layers 18 and 22 and the electro-optic layer 10 must be suitably related. Illustratively, let $\rho_{18}$, $\rho_{22}$ and $\rho_{10}$, and $t_{18}$, $t_{22}$ and $t_{10}$, represent the resistivities and thicknesses of the respective layers. Further, let $t_s = t_{18} + t_{22}$ and $\rho_{18} = \rho_{22}$. Assume that the diameter $D_{18}$ (or $D_{22}$) of the encompassed layer is much greater than the thickness of any of the layers, i.e., $D_{18} >> t_s$, $t_{10}$. Then if $\rho_{10}t_{10}$ is too large relative to $\rho_{18}/t_s$, the voltage gradient in the electrode layers will be too small and the device will operate only for electro-optic materials with extremely sharp threshold dependencies. Similarly, if $\rho_{10}t_{10}$ is too small relative to $\rho_{18}/t_s$, the voltage gradient in the electrodes will be too large and only a very small fraction of the voltage will appear across the electro-optic material near the center of the device. Analysis of a simplified model of this system, i.e., a one-dimensional distributed-parameter lossy transmission line, shows that the device parameters should advantageously satisfy the relation $$[2(\rho_{10}/\rho_{18})t_s t_{10}]^{1/2} \approx (D_{18}/2)$$

where the exact proportionality suitable for a particular device depends on the sharpness of the threshold for the specific electro-optic material used. For applied a.c. voltages the distributed reactances of the various layers and of the electro-optic layer 10 in particular must be considered in an analogous manner.

Assume, for example, that the electro-optic layer 10 of FIG. 2 has the characteristic shown in FIG. 1A. In that case, with no voltage applied to the ring electrodes 16 and 20, the entire area of the electro-optic material 10 underlying the circular electrode portion 18 is relatively transparent to incident light. Accordingly, a maximum amount of any input light propagating in the direction of dashed line 30 (FIG. 2) will be transmitted through the depicted structure along the axis 28 and be emitted from the bottom surfaces of the substrate 14. The device is then in its fully open position.

As the voltage applied to the device of FIG. 2 is increased, a point is reached at which the voltage applied to an outermost annular band of the electro-optic layer 10 exceeds $V_T$ (FIG. 1A). In response thereto, the band becomes optically dense (relatively opaque) and, as a consequence, the effective aperture of the structure is thereby decreased. As the applied voltage is increased further, the width of this opaque annular band expands toward the center of the electro-optic layer 10. Finally, at a predetermined maximum value of applied voltage, the expanded band is coextensive with the entire circular area of the layer 10 underlying the electrode portion 18. At that point the layer 10 is optically opaque and the device (an iris) is in its fully closed (nontransmitting) position. Similarly, if the electro-optic layer 10 of FIG. 2 has the characteristic of FIG. 1B, the depicted device functions as a stop mechanism, which is useful, for example, in Schlieren optical systems.

Figure 4:
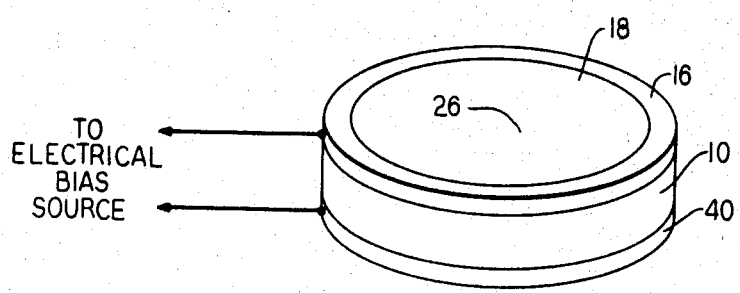
FIG. 4 illustrates a portion of another iris embodiment made in accordance with this invention.

In accordance with the principles of this invention, only one of the electrodes described above need be of the composite type depicted in FIG. 2. This is particularly feasible if the electro-optic layer is sufficiently thin to minimize field spreading across the thickness of the layer. In such an alternative embodiment, only a portion of which is shown in FIG. 4, one of the electrodes may comprise a cylindrically shaped, transparent, low-resistivity member. Such a member 40 is shown in FIG. 4 combined with an electro-optic layer 10 and a composite electrode 16, 18, which members 10, 16 and 18 may be identical to the correspondingly numbered elements in FIG. 2

Figure 5:
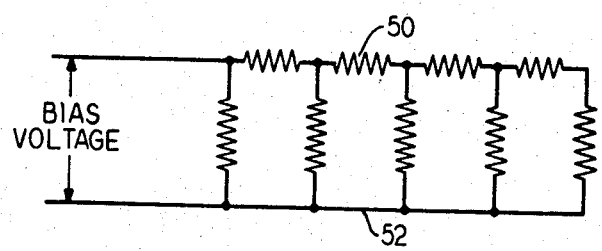
FIG. 5 is a simplified schematic representation of the manner in which the iris shown in FIG. 4 establishes a variable radially directed voltage across the electro-optic layer thereof.

FIG. 5 is a simplified schematic depiction of the radially directed voltage divider action achieved by the FIG. 4 structure. The horizontally extending resistor 50 may be considered to represent the resistance of a selected radial path from the ring electrode 16 of FIG. 4 to the center 26 of the electrode portion 18. The bottom horizontal line 52 of FIG. 5 represents the electrode 40, and the resistors connected between the resistor 50 and the line 52 represent the resistances across the thickness of the electro-optic layer 10 from arbitrarily selected points along the selected radial path.

Figure 6:
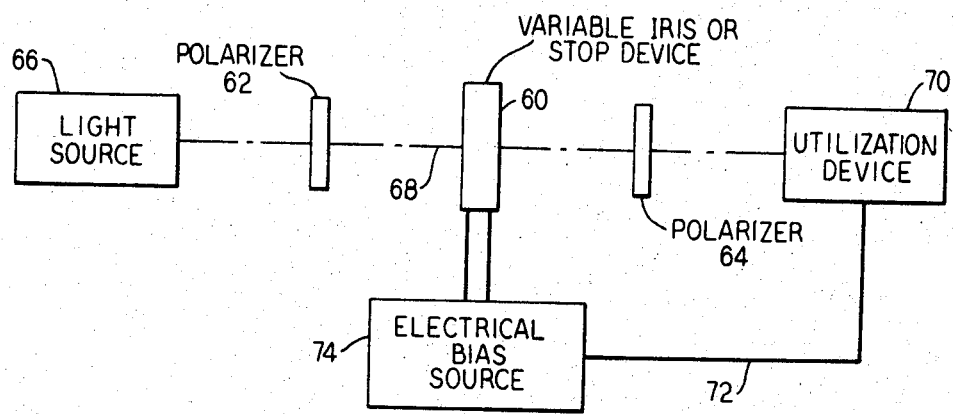
FIG. 6 depicts an illustrative system including a variable iris or stop device made in accordance with the present invention.

An illustrative system including a variable iris or stop device 60 made in accordance with this invention is shown in FIG. 6. The device 60 may be either of the type shown in FIGS. 2 and 3 or of the type partially shown in FIG. 4. If the device 60 included TON as the electro-optic material, parallel or crossed polarizers 62 and 64 are combined with the device to achieve the characteristic of either FIG. 1A or FIG. 1B, in the manner described above. If, on the other hand, the device 60 includes a dipole suspension material of the above-specified type, the polarizers 62 and 64 are omitted from the depicted system.

In FIG. 6 light provided by a source 66 is propagated along an axis 68 to a utilization device 70 via the variable device 60. In one application the amount of light incident on the device 70 is utilized in a conventional way to generate an electrical control signal which is applied by lead 72 to control the magnitude of the bias voltage applied to the device 60 by source 74. In that way, the amount of light directed at the device 70 is easily maintained within specified limits despite the occurrence of gross variations in the output of the source 66.

It is to be understood that the above-described arrangements are only illustrative of the application of the principles of the present invention. In accordance with these principles, numerous other configurations may be devised by those skilled in the art without departing from the spirit and scope of this invention. For example, although emphasis herein has been directed to the use of TON and dipole suspensions as the electro-optic material of a variable iris or stop structure, it is to be understood that a variety of other materials may be used instead. Illustratively, pleochroic dyes dissolved in nematic liquid crystals and nematic liquid crystals in which dynamic scattering occurs may be utilized to construct alternate mechanisms embodying the principles of the present invention.

Additionally, it is feasible to form the transparent bounded portions of the aforementioned composite electrodes to exhibit specific resistances (resistance-per-unit area) that are position-dependent. Such inhomogeneous electrode members can be tailored with considerable flexibility to the particular properties of the associated electro-optic material as well as to the requirements of specified applications.

What is claimed is:

1. In combination,
   a layer of an electro-optic material whose optical transmission characteristics are a function of applied voltage;
   first and second planar electrodes in contact with the respective opposed surfaces of said layer;
   at least the first one of said electrodes com-prising a low-resistivity annular section and a coplanar high-resistivity transparent section bounded by said annular section;
   and means for applying a voltage only between said annular section and said second electrode.

2. A combination as in claim 1 wherein said means for applying comprises only two electrical terminals respective-ly connected to said annular section and to said second electrode.

3. A combination as in claim 2 wherein said material comprises a colloidal dispersion of dipoles suspended in a transparent fluid.

4. A combination as in claim 2 wherein said material comprises a TON material.

5. A combination as in claim 4 further including two polarizers respectively spaced apart from said first and second planar electrodes to form a composite configuration.

6. A combination as in claim 5 wherein said polarizers are crossed with respect to each other.

7. A combination as in claim 5 wherein said polarizers are parallel with respect to each other.

8. A combination as in claim 5 further including means for directing plane-polarized light to propagate through said composite configuration.

9. An electronically-variable variable-aperture device comprising
   a first planar electrode including a low-resistivity annular section and a homogeneous high-resistivity transparent section bounded by said annular section;
   a second planar electrode spaced apart from said first electrode;
   an electro-optic layer interposed between said first and second electrodes;
   bias supply means having only two terminals;
   and means respectively connecting said terminals to the annular section of said first electrode and to said second electrode.

10. A combination as in claim 9 wherein said layer comprises a TON material.

11. A combination as in claim 9 wherein said layer comprises a dispersion of dipoles suspended in a transparent fluid.

12. In combination
    a layer of an electro-optic material whose optical transmission characteristics are a function of applied voltage, said electro-optic material having a resistivity $\rho_1$, first and second planar electrodes in contact with the respective opposed surfaces of said layer, at least the first one of said electrodes comprising a low-resistivity annular section and a coplanar transparent section bounded by said annular section, said bounded section having a resistivity $\rho_2$, where $\rho_2 > \rho_1$, and means for applying a voltage only between said annular section and said second electrode.

13. A combination as in claim 12 wherein said coplanar transparent section is made of a material that exhibits a homogeneous resistivity characteristic.

14. A combination as in claim 12 wherein said coplanar transparent section is made of a material that exhibits an inhomogeneous resistivity characteristic.

* * * * *